US009018303B2

United States Patent
Kho et al.

(10) Patent No.: US 9,018,303 B2
(45) Date of Patent: Apr. 28, 2015

(54) ACRYLIC PRESSURE SENSITIVE ADHESIVE COMPOSITIONS HAVING PLASTICIZER

(75) Inventors: Dong Han Kho, Daegu (KR); Hyun Ju Cho, Daejeon (KR); Suk Ky Chang, Daejeon (KR); Jang Soon Kim, Daejeon (KR); Yoon Jung Baek, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1409 days.

(21) Appl. No.: 12/448,906

(22) PCT Filed: Oct. 17, 2007

(86) PCT No.: PCT/KR2007/005079
§ 371 (c)(1),
(2), (4) Date: Sep. 28, 2010

(87) PCT Pub. No.: WO2008/088116
PCT Pub. Date: Jul. 24, 2008

(65) Prior Publication Data
US 2011/0003091 A1    Jan. 6, 2011

(30) Foreign Application Priority Data
Jan. 16, 2007   (KR) ..................... 10-2007-0004867

(51) Int. Cl.
*C09J 133/10* (2006.01)
*C09J 133/12* (2006.01)
*C09K 19/02* (2006.01)
*C09J 133/06* (2006.01)
*C09J 133/08* (2006.01)

(52) U.S. Cl.
CPC .............. *C09J 133/06* (2013.01); *C09J 133/08* (2013.01); *C09J 2201/606* (2013.01)

(58) Field of Classification Search
USPC .................................. 428/1.31; 524/560, 297
See application file for complete search history.

(56) References Cited

U.S. PATENT DOCUMENTS

| 5,508,107 | A | * | 4/1996 | Gutman et al. | ............... 428/339 |
| 5,717,015 | A | | 2/1998 | Dust et al. | |
| 5,753,742 | A | * | 5/1998 | Bumanlag | ..................... 524/501 |
| 5,939,479 | A | * | 8/1999 | Reaves et al. | ................. 524/276 |
| 6,054,213 | A | * | 4/2000 | Peacock et al. | ......... 428/355 AC |
| 6,074,729 | A | | 6/2000 | Watanabe et al. | |
| 6,280,557 | B1 | | 8/2001 | Peloquin et al. | |
| 6,509,076 | B1 | | 1/2003 | Otaki et al. | |
| 6,624,273 | B1 | * | 9/2003 | Everaerts et al. | .......... 526/317.1 |
| 6,913,820 | B2 | | 7/2005 | Inagaki et al. | |
| 2006/0024494 | A1 | | 2/2006 | Amano et al. | |
| 2006/0182958 | A1 | * | 8/2006 | Okochi et al. | .......... 428/355 AC |
| 2006/0279922 | A1 | | 12/2006 | Cho et al. | |

FOREIGN PATENT DOCUMENTS

KR   10-2006-0128660 A   12/2006
TW   200613492   5/2006

* cited by examiner

*Primary Examiner* — Satya Sastri
(74) *Attorney, Agent, or Firm* — McKenna Long & Aldridge, LLP

(57) ABSTRACT

The present invention relates to an acrylic pressure-sensitive adhesive composition. More specifically, the present invention relates to an acrylic pressure-sensitive adhesive composition comprising a) acrylic copolymers; b) a hydrophilic plasticizer; and c) a hydrophobic plasticizer. The acrylic pressure-sensitive adhesive composition according to the present invention has no mura under moisture and heat resistant condition, and thus has an excellent stain resistance of adherends, and an excellent wettability, endurance reliability, transparency and adhesion reliability, regardless of whether surface property of the adherend is hydrophillic or hydrophobic.

16 Claims, 1 Drawing Sheet

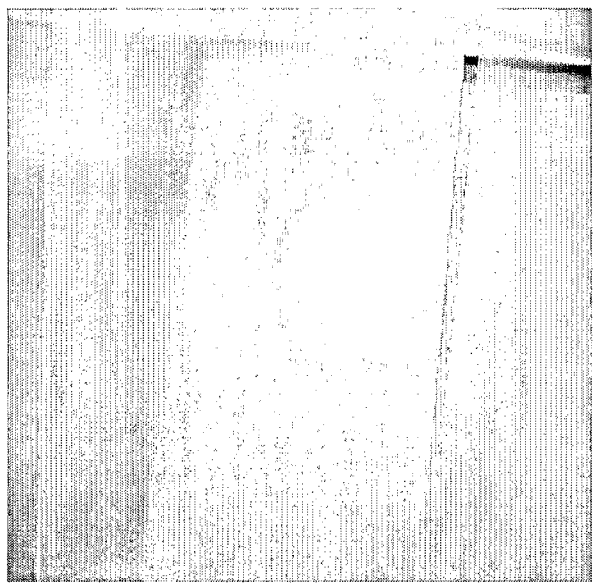

ACRYLIC PRESSURE SENSITIVE ADHESIVE COMPOSITIONS HAVING PLASTICIZER

This application claims the benefit of PCT/KR2007/005079, filed on Oct. 17, 2007, and Korean Patent Application No. 10-2007-0004867, filed on Jan. 16, 2007, both of which are hereby incorporated herein by reference for all purposes in their entireties.

TECHNICAL FIELD

The present invention relates to an acrylic pressure-sensitive adhesive composition. More specifically, the present invention relates to an acrylic pressure-sensitive adhesive composition having no mura (unevenness or spot) under moisture and heat resistant condition, and thus having an excellent stain resistance of adherends, and an excellent wettability, endurance reliability, transparency and adhesion reliability, regardless of whether surface property of the object is hydrophilic or hydrophobic.

BACKGROUND ART

Generally, surface protective films are used for purposes to prevent wounds or stains mimed when they are adhered to bodies to be protected, that is, adherends, which are processed or returned, using pressure-sensitive adhesive layers applied to their sides.

For example, in polarizing plates used in panels of liquid crystal displays, adhesion sides with pressure-sensitive adhesive layers of surface protective films have been protecting by the films, which are released and removed later on inspection process. However, fine bubbles may be incorporated when the protective films are adhered. A number of bubbles are generated under high temperature or high pressure condition such as autoclave process to muse defects. In addition, when the polarizing plates are adhered to panels of liquid crystal displays, or when panels are transferred, fine bubbles are generated on surfaces of surface protective films and polarizing plates by transfer equipments. Thus, wetting properties of pressure-sensitive adhesives for surface protective films are of interest.

Recently, surface treatments of polarizing plates are performed by various means. Surface treatments of polarizing plates include antiglare layers, low refractive index layers and/or high refractive index layers, or stain resistant layers, each of which has different surface roughness and surface energy. Especially, the antiglare layer has higher surface roughness than that of a triacetylcellulose layer and is generally hydrophobic to have low surface energy. Therefore, when the surface protective films are adhered, the amount of resulting fine bubbles varies depending on their surface properties (hydrophilic or hydrophobic) and affects greatly on wetting properties of pressure-sensitive adhesive for protective films.

Meanwhile, to evaluate reliability of panels in liquid crystal displays to which polarizing plates are adhered, they are left under high temperature and high humidity conditions for a long time. At this time, mura may be generated on surfaces of protective films by additives added for improving wetting property of protective films, or stains of polarizing plates may be caused, with transferring additives to surfaces of polarizing plates, to raise panel defects.

Generally, mura means stains generated to surfaces by exterior condition and allowed to be visually detected. Said mura includes cases of generating water spots due to different hydrophilicity of ingredients on storing under moisture-heat resistant condition, causing opacity due to different compatibility of various mixtures, or causing different turbidity (haze) in colors or surfaces due to heterogeneous dispersion of additives. Therefore, when mura is generated, appearance is poor. Particularly, mura in protective films may contaminate surfaces of adherends to be protected so that mum is an important problem.

Meanwhile, when polarizing plates are stored in a state of adhering surface protective films thereto under high temperature or high temperature and humidity condition, curls of polarizing plates may be generated depending on properties of additives in the protective films. The polarizing plates are prepared by laminating triacetylcellulose layer above and below polyvinylalcohol films, and curls are generated by difference between interlayer shrinkage and swell. Then, the triacetyl cellulose layer protecting surfaces by adhering the protective film thereto, is influenced by shrinkage or swell, depending on whether the additive is hydrophilic or hydrophobic, to cause curls in polarizing plates, which has severer effects under high temperature or high temperature and humidity condition.

To improve wetting properties and stain resistance of said adherend, various types of plasticizers or surfactants have been used.

In Japanese Unexamined Patent Publication Nos. H06-128539 and 2005-314476, antistatic agents of polyether polyol compounds and alkali metal salts were added to inhibit bleeding the antistatic additives to surfaces of adherends. However, bleeding of antistatic agents could not be effectively inhibited in the above disclosures. Especially, there was a problem that mum might be caused under moisture-heat resistant condition due to hydrophilicity, a property that polyether polyol has.

In addition, it is described in Japanese Unexamined Publication No. 2005-338150 that contamination of surfaces of an optical film can be prevented by containing an ionic antistatic agent in a pressure-sensitive adhesive layer of the protective film, and saponifying the surface of optical film or pre-treating it with corona or UV, and the like. However, in the above disclosure, further process of pre-treatment was not only required for preparing optical films, but the protective film had also problems in terms of adhesion reliability and release force due to treatment by aqueous alkali hydroxide or corona used in saponification.

On the other hand, Japanese Unexamined Publication No. 2005-326531 discloses a polarizing plate with a protective film inhibiting generation of curls by restricting water content in the polarizing plate with pressure-sensitive adhesive. The above disclosure indicated that cause of curls in the polarizing plate was the water content in the polarizing plate. However, it did not indicate that additives in the protective film adhered to the polarizing plate, affected on the water content.

DISCLOSURE OF INVENTION

Technical Solution

The present invention is intended to solve such problems of the prior art. One object of the present invention is to provide an acrylic pressure-sensitive adhesive composition having an excellent wettability regardless of surface properties of adherends, having no mura under moisture and heat resistant condition to improve stain resistance of adherends, and having an excellent endurance reliability, transparency and adhesion reliability.

The other object of the present invention is to provide a protective film, a polarizing plate and a liquid crystal display device, applied thereon by said acrylic pressure-sensitive adhesive composition having an excellent wettability regardless of surface properties of adherends, having no mum under moisture and heat resistant condition to improve stain resistance of adherends, and having an excellent endurance reliability, transparency and adhesion reliability, without changing adhesion properties.

BRIEF DESCRIPTION OF THE DRAWINGS

FIG. 1 is a photograph taking mura generation warding to a Comparative Example of the present invention.

BEST MODE FOR CARRYING OUT THE INVENTION

To achieve the above purposes, the present invention provides an acrylic pressure-sensitive adhesive composition comprising
a) acrylic copolymers;
b) a hydrophilic plasticizer; and
c) a hydrophobic plasticizer.

The present invention also provides a protective film comprising
a substrate; and
a pressure-sensitive adhesive layer formed on one side or both sides of the substrate, and containing said acrylic pressure-sensitive adhesive composition according to the present invention.

The present invention also provides a polarizing plate comprising said protective film; and a liquid crystal display device comprising a liquid crystal panel, wherein the polarizing plate is bonded to one side or both sides of a liquid crystal cell.

The present invention is described in detail below.

The inventors accomplished the present invention by identifying that when a hydrophilic plasticizer and a hydrophobic plasticizer are simultaneously mixed with an acrylic pressure-sensitive adhesive, they could provide the pressure-sensitive adhesive with an excellent wettability regardless of surface properties, that is, hydrophilic or hydrophobic suffice properties, of adherends, an improved stain resistance of adherends without mute under moisture and heat resistant condition, and an excellent endurance reliability, transparency and adhesion reliability.

Said acrylic copolymers a) used in the present invention are not specifically limited, as long as they can be usually used as pressure-sensitive adhesive in the art, but preferably includes
i) 90 to 99.9 parts by weight of (meth)acrylic aid ester monomers having alkyl group of 1 to 12 carbon atoms; and
ii) 0.1 to 10 parts by weight of vinyl monomers and/or acrylic monomers having cross-linkable functional group.

Said (meth)acrylic aid ester monomers having alkyl group of 1 to 12 carbon atoms in i) may be used such as methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylbutyl(meth)acrylate, 2-ethylhexyl(meth)acrylate, n-octyl(meth)acrylate, isocetyl(meth)acrylate, or isononyl(meth)acrylate alone or by mixing two or more thereof.

Said (meth) acrylic aid ester monomers having alkyl group of 1 to 12 carbon atoms are preferably included in an amount of 90 to 99.9 parts by weight. If the amount is less than 90 parts by weight, the initial adhesion force is lowered. If the amount is in excess of 99.9 parts by weight, there may be caused a problem in durability due to low cohesion force.

Said vinyl monomers and/or acrylic monomers having cross-linkable functional groups in ii) function to react with a cross-linking agent and give cohesion force or adhesion force by a chemical bond to the pressure-sensitive adhesive such that cohesi on failure of the pressure-sensitive adhesive is not caused under high temperature or high humidity condition.

Said vinyl monomers and/or acrylic monomers having cross-linkable functional groups may be used such as monomers having hydroxyl group, such as 2-hydroxyethyl(meth)acrylate, 2-hydroxypropyl(meth)acrylate, 4-hydroxybutyl(meth)acrylate, 6-hydroxyhexyl(meth)acrylate, 2-hydroxyethyleneglycol(meth)acrylate, or 2-hydroxypropyleneglycol(meth)acrylate; monomers having carboxyl group, such as (meth)acrylic acid, maleic mid, or fumaric acid; or monomers having nitrogen atom, such as acrylamide, N-vinyl pyrrolidone, or N-vinyl caprolactam alone or by mixing two or more thereof.

Said vinyl monomers and/or acrylic monomers having cross-linkable functional groups are preferably included in the acrylic copolymer in an amount of 0.1 to 10 parts by weight. If the amount is less than 0.1 parts by weight, there is a problem that cohesion failure is easily developed under high temperature or high humidity condition. If the amount is in excess of 10 parts by weight, there is a problem that compatibility is reduced, followed by reduction of flow characteristic.

In addition, the present invention preferably comprises a co-monomer as an optional component, for regulating the glass transition temperature of pressure-sensitive adhesive on preparing the acrylic copolymer or providing other functionality.

If said co-monomers are aryl pressure-sensitive adhesive resin having a glass transition temperature of −130 to 50° C. in a state of uncross-linking as monomers having usual copolymerizable vinyl groups, all the co-monomers may be used, but preferably vinyl monomers of Formula 1 below.

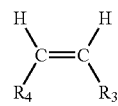

1 wherein,
R4 represents hydrogen or alkyl,
R3 represents cyano, phenyl unsubstituted or substituted with alkyl, acetyloxy, or COR5, where R5 amino or glycidyloxy unsubstituted or substituted with alkyl.

Preferred examples of said functional monomers include, but not limited to, acrylonitrile, (meth)acrylamide, N-methylacrylamide, styrene, methylstyrene, glycidyl(meth)acrylate, and vinylacetate. Said monomers may be used alone or in a mixture thereof.

The acrylic copolymers comprising the above ingredients may be prepared by usual methods such as solution polymerization, photopolymerization, bulk polymerization, suspension polymerization, or emulsion polymerization, and more preferably, solution polymerization. At this time, the polymerization temperature is 50 to 140° C. It is preferred to mix an initiator in a state that monomers are homogeneously mixed.

The additive b) used herein is a hydrophilic plasticizer, and the additive c) is a hydrophobic plasticizer. The present invention is characterized by simultaneously using said hydrophilic plasticizer and hydrophobic plasticizer.

If the hydrophilic plasticizer is only used, the hydrophilic adherend, for example, triacetyl cellulose layer of polarizing plate, has an excellent wettability, so that fine bubbles are not generated between the adherend and the protective film even over various processes. However, the hydrophobic adherend, for example, antiglare layer of triacetyl cellulose layer of polarizing plate, has a low wettability, so that many fine bubbles are generated. To give sufficient wettability to the hydrophobic adherend by using said hydrophilic plasticizer, a large amount of hydrophilic plasticizer has to be used. However, such case has so high hygroscopicity under moisture-heat resistant condition that it may generate mum in the protective film, muse to contaminate the adherend, bleed moisture absorbed with the hydrophilic plasticizer into an adherend such as a polarizing plate, and muse curls in the adherend.

On the other hand, if the hydrophobic plasticizer is only used, mum is not generated in the protective film under moisture-heat resistant condition. But wettability to the hydrophilic adherend is remarkably lowered so that fine bubbles are generated between the adherend and the protective film.

A molar ratio of the hydrophilic plasticizer and the hydrophobic plasticizer above according to the present invention is not specifically limited. But the molar ratio is preferably 1:1,000 to 1:0.1, depending on surface properties of adherends. If the molar ratio is in excess of 1:1,000, the amount of hydrophilic plasticizer is so impaired that wettability to the hydrophilic adherend may be lowered. If the ratio is less than 1:0.1, the amount of hydrophobic plasticizer is so impaired that wettability to the hydrophobic adherend may be lowered.

Total amount of hydrophilic plasticizer and hydrophobic plasticizer to be included for affording wettability to adherends having various surface properties is preferably 0.05 to 10 parts by weight, and more preferably 1 to 5 parts by weight, relative to 100 parts by weight of the acrylic copolymers. If the amount is less than 0.05 parts by weight, wettability is not afforded to the pressure-sensitive adhesive. If the amount is in excess of 10 parts by weight, the adherend may cause contamination, and adhesion reliability is lowered.

Preferably, said hydrophilic plasticizer may have one or more polar groups selected from the group consisting of an ether group (—O—), a ketone group (—CO—), an ester group (—COO—), —OH, —NH2, —SO3H, an amide group, and a phosphoric ester group within its stricture.

More specifically, plasticizers or surfactants may be used, for example, those having one or more polar groups such as —COOM (wherein M is hydrogen; mono-valent, di-valent or tri-valent metal ion; or an ammonium ion unsubstituted or substituted with an alkyl group), —OH, —NH2, —SO3H, an amide group, or a phosphoric ester group at their end, or those that characteristic of polar groups such as an ester group (—O—), a ketone group (—CO—), an ester group (—COO—), and the like is more predominant than that of non-polar groups such an alkyl group or an aromatic group within their strictures alone or by mixing two or more thereof.

Among the plasticizers having said polar groups, it is preferred that plasticizers or surfactants have an ether group (—O—), preferably an alkylene oxide group within their strictures. Specific examples may include, but not limited to, nonionic plasticizers or surfactants such as polyoxy alkylene fatty acid esters, polyoxy alkylene sorbitan fatty acid esters, polyoxy alkylene sorbitol fatty acid esters, polyoxy alkylene alkyl ethers, polyoxy alkylene alkyl allyl ethers, polyoxy alkylene alkyl phenyl ether, polyoxy alkylene derivatives, polyoxy alkylene alkyl amines, or polyoxy alkylene amine fatty acid esters; anionic plasticizers or surfactants sixth as polyoxy alkylene alkyl ether sulfuric ester salts, polyoxy alkylene alkyl ether phosphates, polyoxy alkylene alkyl phenyl ether sulfates, or polyoxy alkylene alkyl phenyl ether phosphates; or cationic plasticizers or surfactants having alkylene oxide group.

Especially, plasticizers or surfactants having ethylene oxide group are more preferred. Specific examples may include, but not limited to, nonionic plasticizers or surfactants such as polyoxy ethylene fatty aid esters, polyoxy ethylene sorbitan fatty acid esters, polyoxy ethylene sorbitol fatty aid esters, polyoxy ethylene alkyl ethers, polyoxy ethylene alkyl allyl ethers, polyoxy ethylene alkyl phenyl ethers, polyoxy ethylene derivatives, polyoxy ethylene alkyl amines, or polyoxy alkylene amine fatty acid esters; anionic plasticizers or surfactants such as polyoxy ethylene alkyl ether sulfuric ester salts, polyoxy ethylene alkyl ether phosphates, polyoxy ethylene alkyl phenyl ether sulfates, or polyoxy ethylene alkyl phenyl ether phosphates; or cationic plasticizers or surfactants having an alkylene oxide group.

Meanwhile, said hydrophobic plasticizers mean plasticizers or surfactants that total characteristic is near to nonionic or hydrophobic property due to nonionic groups or hydrophobic groups even in the absence or presence of the end groups, polar groups or hydrophilic groups mentioned in the hydrophilic plasticizers. These hydrophobic plasticizers may be used alone or by mixing two or more thereof.

Preferably, said hydrophobic plasticizers having nonionic or hydrophobic property may be one or more selected from the group consisting of phthalate compounds, adipate compounds, trimellitate compounds, polyester compounds, phosphate compounds, and oxalate compounds.

In said hydrophobic plasticizers, the phthalate compound is di-butyl phthalate (DBP), di-2-ethylhexyl phthalate (DOP), di-iso-nonyl phthalate (DINP), or di-iso-decyl phthalate (DIDP);

the adipate compound is di-2-ethylhexyl adipate (DOA), or di-iso-nonyl adipate (DINA);

the trimellitate compound is tri-2-ethylhexyl trimellitate (TOTM);

the phosphate compound is tricresyl phosphate (TCP); and the oxalate compound may be used di-butyl oxalate and the like, without limitation.

The acrylic pressure-sensitive adhesive composition according to the present invention may further comprise an antistatic agent for affording antistatic property, together with said hydrophilic plasticizer or hydrophobic plasticizer.

Preferably, said antistatic agent may be an ionic compound of an inorganic salt comprising a metal cation and an anion, or an organic salt comprising an onium cation and an anion, wherein it may afford electric or ionic conductivity.

Said metal cation includes an alkali metal or alkali earth metal cation. It may be preferably selected from the group consisting of lithium (Li+), sodium (Na+), potassium (K+), rubidium (Rb+), cesium (Cs+), beryllium (Be2+), magnesium (Mg2+), calcium (Ca2+), strontium (Sr2+) and barium (Ba2+), and more preferably, selected from lithium (Li+), sodium (Na+), potassium (K+), cesium (Cs+), beryllium (Be2+), magnesium (Mg2+), calcium (Ca2+), and barium (Ba2+), and most preferably, use lithium, which has high ion stability and is easily moved in the pressure-sensitive adhesive.

In addition, for said onium cation, nitrogen onium cation, phosphorous onium cation, or sulfur onium cation may be used preferably. The term "onium" herein means an ion charged positive retaining at least some of electric charges localized on one or more nitrogen, phosphorous, or sulfur atoms.

Said onium cation may be a cyclic type, in which atom(s) form(s) a ring, or a non-cyclic type. The cyclic cation may be an aromatic saturated or unsaturated cation. The cyclic cation may contain one or more cyclic hetero atoms (for example oxygen, sulfur) except for nitrogen, phosphorous, or sulfur, and be optionally substituted with a substituent such as hydrogen, halogen, alkyl, or aryl. The non-cyclic cation may retain an organic substituent or a R group to which one or more, preferably, four or more, nitrogens are attached, and the remaining substituents of hydrogen. Said R group may be cyclic or non-cyclic, substituted or unsubstituted, aromatic or non-aromatic and contain one or more hetero atoms (for example, nitrogen, oxygen, sulfur, phosphorous or halogen).

In the ionic compounds, anions are preferably selected from the group consisting of iodide (I—), chloride (Cl—), bromide (Br—), nitrate (NO3-), sulfonate (SO4-), methylbenzenesulfonate (CH3(C6H4)SO3-), carboxybenzenesulfonate (COOH(C6H4)SO3-), benzoate (C6H5COO—), perchlorate (ClO4-), hydroxide (OH—), trifluoroacetate (CF3COO—), trifluoromethanesulfonate (CF3SO2-), tetrafluoroborate (BF4-), tetrabenzylborate (B(C6H5)4-), hexafluorophosphate (PF6-), bistrifluoromethanesulfoneimide (N(SO2CF3)2-), bispentafluoroethanesulfoneimide (N(SOC2F5)2-), bispentafluoroethanecarbonylimide (N(COC2F5)$_2$—), bisperfluorobutanesulfoneimide (N(SO2C4F9)2-), bisperfluorobutanecarbonylimide (N(COC4F9)2-), tristrifluoromethanesulfonylmethide (C(SO2CF3)3-), and tristrifluormethanecarbonylmethide (C(SO2CF3)3-), but not limited thereto.

Said antistatic agent is preferably used in an amount of 0.001 to 10 parts by weight, relative to 100 parts by weight of the acrylic copolymers. Within the above range, ion conductivity for antistatic performance may be regulated, and no whitening phenomenon is not only present under the moisture-heat resistant condition, but optical transparency, adhesion, endurance reliability, and antistatic property are also remained. If the amount of said antistatic agent is less than 0.001 parts by weight, antistatic performance is lowered. If the amount is in excess of 10 parts by weight, adhesive durability is deteriorated due to reduction of cohesion force.

The present acrylic pressure-sensitive adhesive composition may further comprise a cross-linking agent.

Said cross-linking agent may regulate adhesion of the pressure-sensitive adhesive depending on the used amount, and functions to improve cohesion of the pressure-sensitive adhesive by reacting with carboxyl group or hydroxyl group.

Said cross-linking agent may be used such as isocyanate compounds, epoxy compounds, or aziridine compounds. Especially, it is preferred to use isocyanate compounds.

Specifically, said isocyanate compounds may be used tolylenediisocyante, xylenediisocyanate, diphenylmethanediisocyanate, hexamethylenediisocyanate, isoformdiisocyanate, tetramethylxylene diisocyanate, naphalenediisocyanate, or reaction products thereof with polyol such as trimethylolpropane.

Said epoxy compounds may be used ethyleneglycoldiglycidylether, triglycidylether, trimethylolpropanetriglycidylether, N,N,N',N'-tetraglycidylethylenediamine, or glycerin diglycidylether.

Said aziridine compounds may be used such as N,N'-toluene-2,4-bis(1-aziridinecarboxide), N,N'-diphenylmethane-4,4'-bis(1-aziridinecarboxide), triethylenemelamine, bisisophthaloyl-1-(2-methylaziridine), or tri-1-aziridinylphosphineoxide.

Said cross-linking agent may be preferably included in an amount of 0.1 to 10 parts by weight relative to 100 parts by weight of the acrylic copolymer. If the amount is less than 0.1 parts by weight, sufficient cohesion is not provided and high speed releasability is lowered. If the amount is in excess of 10 parts by weight, pressure-sensitive adhesion/adhesion properties are so lowered that there is a problem that wettability into adherends is much reduced.

In addition, the present acrylic pressure-sensitive adhesive composition may further comprise additives such as tackifier resin, acrylic low molecular weight materials, epoxy resin, hardener, ultraviolet stabilizer, antioxidant, colorant, reinforcing agent, filler, antifoaming agent, or foaming agent, if desired.

The method for preparing the present pressure-sensitive adhesive composition comprising the above components is not specifically limited. At this time, if the cross-linking reaction of functional groups in the cross-linking agent has not almost to be occurred in a combination process practiced for forming a pressure sensitive adhesive layer, uniform coating works can be practiced. After finishing such coating works followed by drying and aging processes, the pressure-sensitive adhesive layer having elasticity and strong cohesion may be obtained, with forming the cross-linking structure. Then, adhesion properties, such as endurance reliability, and cutting properties, of adhesion products are improved by the strong cohesion of pressure sensitive adhesive.

Preferably, said present acrylic pressure-sensitive adhesive composition has a cross-linking density of 90% or more. If the cross-linking density is less than 90%, there is a problem that high speed releasibiliy is lowered.

In addition, the present invention relates to a protective film comprising
a substrate; and
a pressure-sensitive adhesive layer formed on one side or both sides of the substrate, and containing said acrylic pressure-sensitive adhesive composition according to the present invention Said protective film consists of a substrate as a layer for protecting surfaces of optical films, preferably, polarizing plates, and a pressure-sensitive adhesive layer.

Said substrate film is not specifically limited, but may be used polyester films having transparency such as cellulose, polycarbonate, or polyethylene terephthalate; polyether films such as polyethersulfone; or polyolefin films such as polyethylene, polypropylene, polyolefin having cyclo or norbornene, or ethylene propylene copolymer.

The above transparent substrate film may be laminated by a single layer or two or more layers, and its thickness may be appropriately selected and used, depending on purposes, but preferably 5 to 500 μm, more preferably 10 to 100 μm.

Also, the transparent substrate film may be not only subjected to surface-treatment or primer-treatment on one side or both sides, to enhance adherence property of substrate with the pressure-sensitive adhesive layer, but also equipped with an antistatic layer or an antifouling layer, and the like.

The method for forming the pressure sensitive adhesive layer on the substrate film is not specifically limited. For example, a method for applying the pressure-sensitive adhesive directly on a surface of the substrate film using Bar Coater and drying it, a method for applying the pressure-sensitive adhesive on a surface of the releasable substrate and drying it, and then transferring the pressure-sensitive adhesive layer formed on the releasable substrate surface into the surface of substrate film and aging it, and the like may be applied. At that time, the thickness of pressure-sensitive adhesive layer is preferably 2 to 100 μm, and more preferably 5 to 9 μm. If the thickness is departed from the above ranges, it is hard to obtain uniform pressure-sensitive adhesive layer, and thus there is a problem that the adhesion film has no uniform physical properties.

The present invention also relates to a polarizing plate comprising
a polarizing film or a polarizing device; and
a protective film according to the present invention.

Polarizing films or polarizing devices composing the polarizing plate are not specifically limited. For example, said polarizing film may be used a film prepared by containing a polarizing component such as iodine or a dichroic dye onto a film of a polyvinyl alcohol resin and elongating the resulting product. The thickness of said polarizing film is also not specifically limited, and may form a usual thickness. Said polyvinyl alcohol resin may use polyvinyl alcohol, polyvinyl formal, polyvinyl acetal, or a saponified product of ethylene vinyl acetate copolymer, and the like.

On both sides of the polarizing film, multilayer films may be formed, on which a protective film is laminated, such as cellulose film, for example, triacetal cellulose, etc; a polyester film, for example polycarbonate film, polyethylene terephthalate, etc; polyether sulphone film; polyolefins, for example, polyethylene, polypropylene, polyolefin having cyclo or norbornene structure, or polyolefins, for example, ethylene propylene copolymer. The thickness of these protective films is not specifically limited, and may form a usual thickness.

In addition, on the polarizing plate of the present invention may be laminated one or more layers providing additional functions, such as protective layer, reflecting layer, antiglare layer, phase retardation plate, compensation film for wide view angle, and brightness enhancing film. The protective film wording to the present invention may also be adhered to each of the functional layers.

The present invention also relates to a liquid crystal display device comprising said polarizing plate. The polarizing plate applied by the present pressure-sensitive adhesive can be applied to all usual liquid crystal display devices, the kind of which liquid crystal panel is not specifically limited. Preferably, the present invention may constrict liquid crystal display devices comprising a liquid crystal panel binding the pressure-sensitive adhesive polarizing plate to one side or both sides of a liquid crystal cell.

On the one hand, the present acrylic pressure-sensitive adhesive composition may be used in industrial sheets, particularly, protective film, cleaning sheet, reflective sheet, structural pressure-sensitive adhesive sheet, photographic pressure-sensitive adhesive sheet, lane marking pressure-sensitive adhesive sheet, optical pressure-sensitive adhesive product, or pressure-sensitive adhesive for electronic components. The present composition can also be applied to applying fields having an equivalent functional concept such as multi-layer structured laminate products, which are general commercial pressure-sensitive adhesive sheet products, medical patches, or heat activated pressure-sensitive adhesives.

Preferred examples are represented below, to help understanding of the present invention. The examples below are intended to illustrate the present invention, but the scope of the present invention is not restricted to the examples below.

EXAMPLE 1

Preparation of Acrylic Copolymers

A mixture of monomers consisting of 89.0 parts by weight of 2-ethylhexylacrylate (2-EHA), 9.0 parts by weight of n-butylacrylate (BA), 2.0 parts by weight of 2-hydroxyethylacrylate (2-HEA) was added into an 1 L reactor equipped with a (poling system for reflux of nitrogen gas and easy regulation of temperature, and then 100 parts by weight of ethyl acetate (EAc) as a solvent. To remove oxygen, nitrogen gas was purged for 1 hour, and the temperature was kept at 55° C. To the above mixture, 0.05 parts by weight of azobisisobutyronitrile (AIBN) diluted in ethylacetate to a concentration of 50%, as a reaction initiator, was added and reacted for 8 hours to prepare acrylic copolymers.

(Combination and Coating Procedure)

100 parts by weight of the acrylic copolymers prepared above, 3.0 parts by weight of pre-polymer of hexamethylenediisocyanate (HDI), 2.0 parts by weight of PEL-20A (a composite mixed with lithium perchlorate (10 wt %) for providing polyethylene glycol/propylene oxide copolymer as a plasticizer with antistatic effect), and 2.0 parts by weight of dibutylphthalate (DBP) were added, diluted to an appropriate concentration, and mixed homogeneously. Then, the resulting mixture was coated on one side of biaxial stretched polyethyleneterephthalate film with a thickness of 38 μm and dried to prepare homogeneous pressure-sensitive adhesive layer with a thickness of 20 μm.

(Laminating Procedure)

A release film was laminated to the pressure-sensitive adhesive layer coated on one side of the polyethyleneterephthalate film above, and then stored at 40 C for 4 days for sufficient ageing procedure.

The protective film prepared above was cut into proper sizes, adhered to surfaces of triacetyl cellulose (TAC film, Fuji Film Corporation, Japan) and antiglare layer (AG TAC, surface roughness of 0.3, Dai Nippon Printing Co, Ltd., Japan) in polarizing plates, respectively, and used for evaluation.

EXAMPLES 2 to 5 AND COMPARATIVE EXAMPLES 1 to 4

The same method as Example 1 above was practiced except for using the components and ratios in Example 1 as shown in Table 1 below. Unit in Table 1 is represented in part by weight.

TABLE 1

|  |  | Class | | | | | | | | | |
|---|---|---|---|---|---|---|---|---|---|---|---|
|  |  | Example | | | | | Comparative Example | | | | |
|  |  | 1 | 2 | 3 | 4 | 5 | 1 | 2 | 3 | 4 | 5 |
| Acrylic Copolymer | | 100 | 100 | 100 | 100 | 100 | 100 | 100 | 100 | 100 | 100 |
| Hydrophilic:Hydrophobic (molar ratio) | | 1:0.5 | 1:254 | 1:0.8 | 1:858 | 1:48 |  |  |  | 1:1287 |  |
| Hydrophilic | PEL-20A | 4 | 0.03 | 4 | 0.03 | 0.2 | 0.01 |  | 12 | 0.03 |  |
| Hydrophobic | DBP | 0.5 | 2 |  |  | 2 |  | 2 |  |  |  |
|  | DBO |  |  | 0.5 | 4 | 0.5 |  |  |  | 6 |  |

TABLE 1-continued

| | | Class | | | | | | | | |
|---|---|---|---|---|---|---|---|---|---|---|
| | | Example | | | | | Comparative Example | | | |
| | | 1 | 2 | 3 | 4 | 5 | 1 | 2 | 3 | 4 | 5 |
| Hydrophilic + Hydrophobic | Pycal 94 | | | | | | | | | | 4 |

[Note]
PEL-20A: a composite of lithium perchlorate to polyethylene glycol/propylene oxide copolymer (MW 1300)
DBP: dibutylphthalate (MW 340)
DBO: dibutyloxalate (MW 202)
Pycal 94: polyoxyethylene acryl ether Using the protective films prepared in Examples 1 to 5 and Comparative Examples 1 to 5 above, haze, wettability, releasing strength, and endurance reliability were measured by the methods below and the results were represented in Table 2 below.

1) Haze

After removing the releasing films cohered to the pressure-sensitive adhesive layers, from the protective films prepared in Examples 1 to 5 and Comparative Examples 1 to 5 above, the protective films were impregnated with de-ionized water at room temperature and left for 1 hour. Then, moisture covered around the protective films was removed to measure haze values with Reflectance-Transmittance Meter (HR-100, manufactured by Murakami Color Res. Lab.). When the protective films comprise films and pressure-sensitive adhesives only, containing no plasticizer, they have haze values of approximately 2 to 4. If the value is more than let it affects seriously on mura phenomenon. That is, when the hydrophilic plasticizer is included in larger quantity, the haze value is increased by higher rate. Therefore, it may be anticipated to cause mura.

2) Wettability

The protective films prepared in Examples 1 to 5 and Comparative Examples 1 to 5 above were adhered to surfaces of triacetyl cellulose (TAC, manufactured by Fuji Film Corporation, Japan) and antiglare layers (AG, manufactured by Dai Nippon Paintings Co, Ltd., Japan) in polarizing plates (25 mm 250 mm) with a 2 kg roller, based on JIS Z 0237, and stored under condition at a temperature of 23° C. and a relative humidity of 65% for 24 hours. When the protective films were released by hand and then adhered again, the wettability was measured as a time for the surface of pressure-sensitive adhesive to be adhered. In addition, the protective films were adhered to surfaces of antiglare layers (AG, manufactured by Dai Nippon Paintings Co., Ltd., Japan) in polarizing plates (250 mm×50 mm) with a 2 kg roller. Then, after autoclave process at a temperature of 75° C. and a pressure of 5 kg/cm$^2$ for 90 minutes, wettability was decided by presence or absence of bubbles.

3) Endurance Reliability

The polarizing plate (200 mm×200 mm, AG, manufactured by Dai Nippon Paintings Co, Ltd., Japan) specimens, to which the protective films prepared in Examples 1 to 5 and Comparative Examples 1 to 5 above were adhered, were observed about whether loosing or releasing was developed under the high temperature condition(80° C., 1,000 hours) and the high temperature and humidity condition(60° C., 90% R.H, 1,000 hours). The endurance reliability was measured depending on evaluation standard below.

Evaluation Standard
○ No loosing or releasing phenomenon
Δ Slight loosing or releasing phenomenon
x Loosing or releasing phenomenon presents 4) Mura Generation The protective films prepared in Examples 1 to 5 and Comparative Examples 1 to 4 above were adhered to surfaces of triacetyl cellulose (TAC, manufactured by Fuji Film Corporation, Japan) and antiglare layers (AG, manufactured by Dai Nippon Paintings Co, Ltd, Japan) in polarizing plates (25 mm×50 mm) with a 2 kg roller, based on JIS Z 0237. Then; the releasing films cohered to pressure-sensitive adhesives for polarizing plates were released and the protective films were adhered to alkali-free glass plates for STN (sodalime glass, 1.1t). After storing them at 60° C., 90% RH for 5 days, the protective films were released from the polarizing plates to observe spot degree therein with a searchlight and measure whether mum was generated, depending on the evaluation standard below.

Evaluation Standard
○ Mura is not generated
x Mura is generated

TABLE 2

| | | Wettability | | | | Endurance Reliability | | |
|---|---|---|---|---|---|---|---|---|
| | | TAC | | AG | | | Moisture- | |
| Class | Haze (%) | Time (sec) | Bubble | Time (sec) | Bubble | Heat Resistance | heat Resistance | Mura Generation |
| Example 1 | 3.5 | 9 | | 9 | | ○ | ○ | ○ |
| Example 2 | 3.0 | 10 | | 9 | | ○ | ○ | ○ |
| Example 3 | 3.6 | 9 | | 9 | | ○ | ○ | ○ |
| Example 4 | 2.9 | 8 | | 9 | | ○ | ○ | ○ |
| Example 5 | 2.8 | 8 | | 9 | | ○ | ○ | ○ |
| Comparative Example 1 | 3.0 | 9 | | 17 | ○ | ○ | Δ | ○ |

TABLE 2-continued

| | | Wettability | | | | Endurance Reliability | | |
|---|---|---|---|---|---|---|---|---|
| | | TAC | | AG | | | Moisture-heat | |
| Class | Haze (%) | Time (sec) | Bubble | Time (sec) | Bubble | Heat Resistance | Resistance | Mura Generation |
| Comparative Example 2 | 3.4 | 15 | ○ | 10 | | ○ | ○ | ○ |
| Comparative Example 3 | 65.3 | 10 | | 20 | | | | |
| Comparative Example 4 | 4.5 | 15 | | 10 | ○ | | ○ | ○ |
| Comparative Example 5 | 4.2 | 15 | ○ | 15 | ○ | | | ○ |

As shown in Table 2 above, the protective films using the acrylic pressure-sensitive adhesive composition, mixed with the hydrophilic plasticizer and the hydrophobic plasticizer, according to the present invention had no mura under moisture and heat resistant condition over Comparative Examples 1 to 5, so that it was allowed to obtain the acrylic pressure-sensitive adhesive composition having an excellent stain resistance of adherends, and an excellent wettability, endurance reliability, transparency and adhesion reliability, regardless of whether surface property of the adherend was hydrophillic or hydrophobic. In Comparative Example 5, Pycal 94, polyoxyethylene acryl ether having both hydrophobicity and hydrophilicity in one molecule, was used Without being haze and mura, it showed that wettability was very poor due to high molecular weight materials and that reliability was deteriorated due to bubbles. FIG. 1 represents Comparative Example 3, and shows mura generated in mura generation test, when an excess of hydrophilic plasticizer was included.

Industrial Applicability

The acrylic pressure-sensitive adhesive composition according to the present invention has no mura under moisture and heat resistant condition, by using simultaneously a hydrophilic plasticizer and a hydrophobic plasticizer, and thus can obtain an excellent stain resistance of adherends, and an excellent wettability, endurance reliability, transparency and adhesion reliability, regardless of whether surface property of the adherend is hydrophillic or hydrophobic.

The present invention is explained in detail, with reference to only the described embodiments above. It is evident to one skilled in the art that various modifications and variations are allowed within the scope and the technical spirit of the present invention. Sixth modifications and variations should be pertained to the attached claims.

The invention claimed is:

1. An acrylic pressure-sensitive adhesive composition for protective film of polarizing plate, comprising:
   a) acrylic copolymers;
   b) a hydrophilic plasticizer; and
   c) a hydrophobic plasticizer,
   wherein the hydrophilic plasticizer is one or more selected from the group consisting of polyoxy alkylene fatty acid esters, polyoxy alkylene alkyl ethers, polyoxy alkylene alkyl allyl ethers, polyoxy alkylene alkyl phenyl ether, polyoxy alkylene alkyl amines, polyoxy alkylene amine fatty acid esters, polyoxy alkylene alkyl ether sulfuric ester salts, polyoxy alkylene alkyl ether phosphates, polyoxy alkylene alkyl phenyl ether sulfates, and polyoxy alkylene alkyl phenyl ether phosphates,
   wherein the hydrophobic plasticizer is one or more selected from the group consisting of di-butyl phthalate (DBP), di-iso-nonyl phthalate (DINP), di-iso-decyl phthalate (DIDP), di-2-ethylhexyl adipate (DOA), di-iso-nonyl adipate (DINA), tri-2-ethylhexyl trimellitate (TOTM), and di-butyl oxalate,
   wherein the molar ratio of the hydrophilic plasticizer to the hydrophobic plasticizer is 1:1.000 to 1:0.1,
   wherein the sum of the hydrophilic plasticizer and the hydrophobic plasticizer is 0.05 to 10 parts by weight relative to 100 parts by weight of the acrylic copolymer,
   wherein haze value, which is measured with reflectance-transmittance meter, after a protective film prepared using the acrylic pressure-sensitive adhesive composition is impregnated with de-ionized water at room temperature and left for 1 hour, and then moisture covered around the protective film is removed, is 3.6% and less, and
   wherein wettability, which is measured as a time for a pressure-sensitive adhesive surface to be adhered, when the protective film is released by hand and then adhered again, after the protective film is adhered to a triacetyl cellulose surface or an antiglare layer surface of a polarizing plate with a 2 kg roller, based on JIS Z 0237, and stored under condition at a temperature of 23° C. and a relative humidity of 65% for 24 hours, is 10 seconds and less.

2. The acrylic pressure-sensitive adhesive composition of claim 1, wherein the acrylic copolymer comprises i) 90 to 99.9 parts by weight of (meth)acrylic acid ester monomers having alkyl group of 1 to 12 carbon atoms: and ii) 0.1 to 10 parts by weight of vinyl monomers and/or acrylic monomers having cross-linkable functional group.

3. The acrylic pressure-sensitive adhesive composition of claim 2, wherein the (meth) acrylic add ester monomer having alkyl group of 1 to 12 carbon atoms is one or more selected from the group consisting of methyl(meth)acrylate, ethyl (meth)acrylate, n-propyl(meth)acrylate, isopropyl(meth) acrylate, n-butyl(meth)acrylate, t-butyl(meth)acrylate, sec-butyl(meth)acrylate, pentyl(meth)acrylate, 2-ethylbutyl (meth)acrylate, 2-ethylhexyl(meth)acrylate, n-octyl(meth) acrylate, isooctyl(meth)acrylate, and isononyl(meth) acrylate.

4. The acrylic pressure-sensitive adhesive composition of claim 2, wherein the vinyl monomer and/or acrylic monomer having cross-linkable functional group is one or more selected from the group consisting of 2-hydroxyethyl(meth) acrylate, 2-hydroxypropyl(meth)acrylate, 4-hydroxybutyl (meth)acrylate, 6-roxyhexyl(meth)acrylate, 2-hydroxyethyleneglycol(meth)acrylate, 2-hydroxypropyleneglycol(meth) acrylate, (meth)acrylic acid, maleic acid, fumaric acid, acrylamide, N-vinyl pyrrolidone, and N-vinyl caprolactam.

5. The acrylic pressure-sensitive adhesive composition of claim 2, wherein the acrylic copolymer further comprises vinyl monomers of Formula 1:

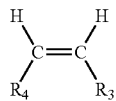

wherein, $R_4$ represents hydrogen or alkyl, $R_3$ represents cyano; phenyl unsubstituted or substituted with alkyl; acetyloxy; or $COR_5$, where $R_5$ represents amino or glycidyloxy unsubstituted or substituted with alkyl.

6. The acrylic pressure-sensitive adhesive composition of claim 1, further comprising an antistatic agent as an additive.

7. The acrylic pressure-sensitive adhesive composition of claim 6, wherein the antistatic agent is an ionic compound selected from an inorganic salt comprising a metal cation and an anion, and an organic salt comprising an onium cation and an anion.

8. The acrylic pressure-sensitive adhesive composition of claim 7, wherein the metal cation is one or more selected from the group consisting of lithium ($LI^+$), sodium ($Na^+$), potassium ($K^+$), rubidium ($Rb^+$), cesium ($Cs^+$), beryllium ($Be^{2+}$), magnesium ($Mg^{2+}$), calcium ($Ca^{2+}$), strontium ($Sr^{2+}$) and barium ($Ba^{2+}$).

9. The acrylic pressure-sensitive adhesive composition of claim 7, wherein the onium cation is nitrogen onium cation, phosphorous onium cation, or sulfur onium cation.

10. The acrylic pressure-sensitive adhesive composition of claim 7. wherein the anion is one or more selected from the group consisting of iodide ($I^-$), chloride ($Cl^-$), bromide ($Br^-$), nitrate ($NO_{3-}$), sulfonate ($SO^{4-}$), methylbenzenesulfonate ($CH_3(C_6H_4)SO_{3-}$), carboxybenzenesulfonate (COOH $(C_6H_4)SO_3^-$), benzoate ($C_6H_5COO^-$), perchlorate ($ClO_4^-$), hydroxide ($OH^-$), trifluoroacetate ($CF_3COO^-$), trifluoromethanesulfonate ($CF_3SO_2^-$), tetrafluoroborate ($BF_4^-$), tetrabenzylborate ($B(C_6H_5)_4^-$), hexafluorophosphate ($PF_6^-$), bistritiuoromethanesulfoneimide ($N(SO_2CF_3)_2^-$), bispentafluoroethanesulfoneimide ($N(SOC_2F_5)_2^-$), bispentafluoroethanecarbonylimide ($N(COC_2F_5)_2^-$), bisperflu-orobutanesulfoneimide ($N(SO_2C_4F_9)_2^-$), bisperfluorobutanecarbonylimide ($N(COC_4F_9)_2^-$), tri strifluoromethanesulfonylmethide ($C(SO_2CF_3)_3^-$), and tristrifluormethanecarbonylmethide ($C(SO_2CF_3)_3^-$).

11. The acrylic pressure-sensitive adhesive composition of claim 1, further comprising a cross-linking agent.

12. The acrylic pressure-sensitive adhesive composition of claim 11 wherein the cross-linking agent is one or more selected from the group consisting of an isocyanate compound, an epoxy compound, and an aziridine compound.

13. The acrylic pressure-sensitive adhesive composition of claim 1. further comprising one or more additives selected from the group consisting of a tackifier resin, an acrylic low molecular weight material, an epoxy resin, a hardener, an ultraviolet stabilizer, an antioxidant, a colorant, a reinforcing agent, a filler, an antifoaming agent, and a foaming agent.

14. A protective film comprising a substrate; and a pressure-sensitive adhesive layer formed on one or both sides of the substrate, and containing the acrylic pressure-sensitive adhesive composition according to claim 1.

15. A polarizing plate comprising a polarizing film or a polarizing device;

and the protective film according to claim 14.

16. A liquid crystal display device comprising a liquid crystal panel, wherein the polarizing plate according to claim 15 is bonded to one or both sides of a liquid crystal cell.

* * * * *